United States Patent
Davis et al.

[15] 3,695,622
[45] Oct. 3, 1972

[54] PISTON RING CONSTRUCTION

[72] Inventors: Lewis M. Davis; Donald M. Hesling, both of Muskegon, Mich.

[73] Assignee: Sealed Power Corporation, Muskegon, Mich.

[22] Filed: Dec. 18, 1970

[21] Appl. No.: 99,571

[52] U.S. Cl. .................................................. 277/139
[51] Int. Cl. .................................................. F02j 5/00
[58] Field of Search ...... 277/138, 139, 140, 144, 146, 277/152, 159, 157; 267/1.5

[56] References Cited

UNITED STATES PATENTS

| | | | |
|---|---|---|---|
| 2,893,798 | 7/1959 | Olson | 277/139 |
| 3,472,521 | 10/1969 | Nister et al. | 277/140 |
| 2,239,703 | 4/1941 | Crawford | 277/146 |
| 2,445,090 | 7/1948 | Thomson | 277/146 |
| 3,055,669 | 9/1962 | Knoebel | 277/139 |
| 3,099,455 | 7/1963 | Mayfield | 277/163 |
| 3,166,331 | 1/1965 | Warrick | 277/139 |
| 3,338,582 | 8/1967 | De Bruin | 277/2 |

FOREIGN PATENTS OR APPLICATIONS

| | | | |
|---|---|---|---|
| 1,155,716 | 12/1957 | France | 277/139 |
| 1,374,228 | 8/1964 | France | 277/140 |
| 356,309 | 9/1961 | Switzerland | 277/139 |

*Primary Examiner*—Frederick L. Matteson
*Assistant Examiner*—Donald B. Massenberg
*Attorney*—Barnes, Kisselle, Raisch & Choate

[57] ABSTRACT

An improved spacer-expander for a piston ring featuring a latch which guides the ends of the spacer-expander into and out of abutment so that they will not become overlapped during assembly to a piston and assembly of the piston and ring assembly into an engine cylinder.

25 Claims, 15 Drawing Figures

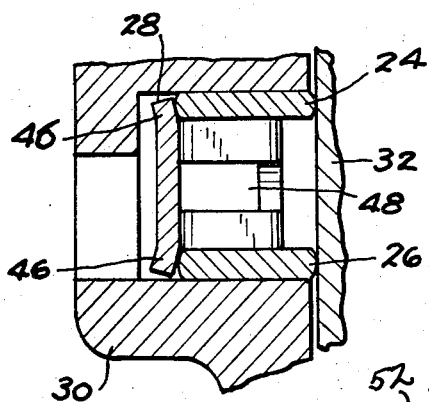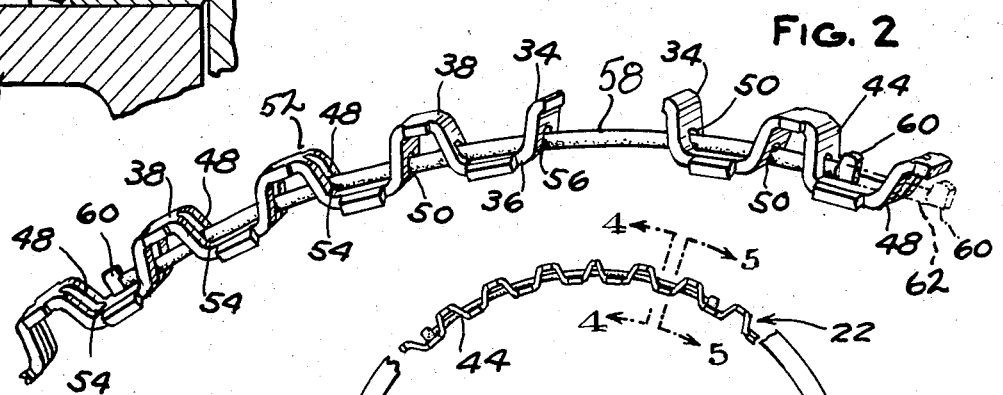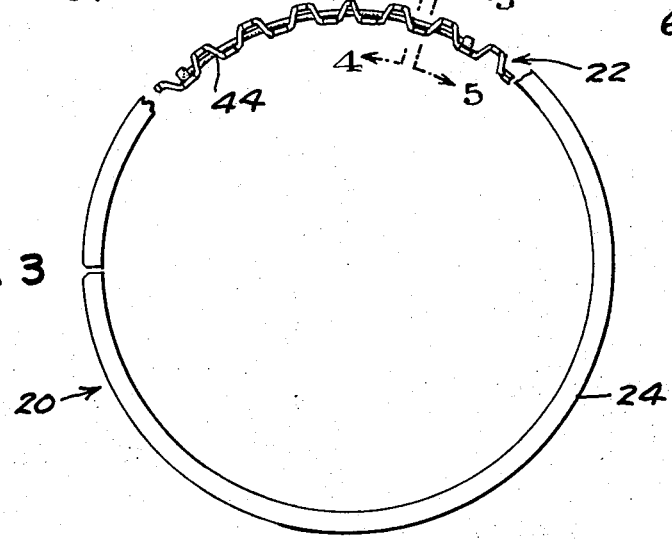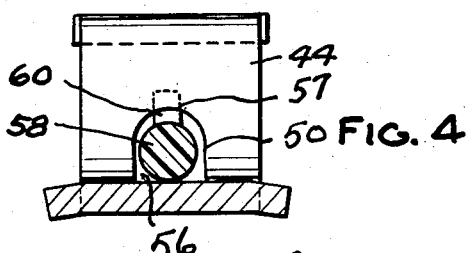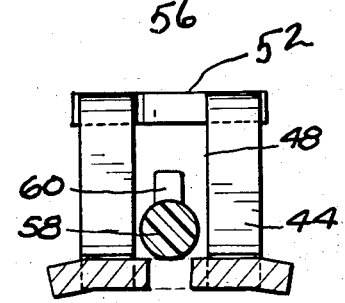

PATENTED OCT 3 1972 3,695,622

INVENTORS
LEWIS M. DAVIS
DONALD M. HESLING
BY
Barnes Kisselle Raisch
& Choate
ATTORNEYS

PISTON RING CONSTRUCTION

This invention relates to a piston ring spacer-expander for internal combustion engines which is provided with a slip latch to prevent overlap of the ends of the spacer-expander.

This improvement is aptly suited for use with a radially corrugated spacer-expander of the type disclosed in U.S. Pat. No. 2,789,872 granted to Holly M. Olson on Apr. 23, 1957, but can also be used with an axially corrugated spacer-expander.

During assembly of the spacer-expander into the ring groove of the piston, the normally abutting ends of the spacer-expander are separated so that it may be slipped over the piston and into the ring groove. With the spacer-expander in the groove, the ends should again return to abutting relationship. However, sometimes the ends overlap. Then again during the installation of the piston and ring assembly into the engine cylinder, it sometimes happens that the ends of the spacer-expander are not in or lose their abutting relationship and become overlapped. This situation results in a defective sealing arrangement of the piston ring with the cylinder wall and consequent impairment of engine performance.

Therefore, among the principal objects of this invention is the provision of an improved spacer-expander of the aforementioned type in which the ends thereof do not overlap and are maintained in aligned or abutting relation during assembly of the piston ring into the ring groove of the piston and during the assembly of the piston and ring assembly into the engine cylinder.

Other objects and features of the invention will become apparent from the following description and drawings in which:

FIG. 1 is a sectional view of a piston ring consisting of a radially corrugated spacer-expander and two rails installed in an engine.

FIG. 2 is a perspective view showing the improved radially corrugated spacer-expander and slip latch.

FIG. 3 is a top view of a piston ring having a portion of a rail broken away to expose the improved spacer-expander of the present invention.

FIG. 4 is an enlarged sectional view taken along line 4—4 in FIG. 3.

FIG. 5 is an enlarged sectional view taken along line 5—5 in FIG. 3.

Figure 6:
FIG. 6 is a perspective view of the curved rod before assembly into the spacer-expander for guiding the ends of the spacer-expander into and out of abutting relationship.

Referring to the drawings and particularly to FIGS. 1, 2 and 3, piston ring 20 comprises a generally circular spacer-expander 22 and upper and lower annular metal rails 24 and 26 respectively. FIG. 1 shows piston ring 20 installed in ring groove 28 extending circumferentially around a piston 30. Spacer-expander 22 urges rails 24 and 26 against cylinder 32 of an internal combustion engine so as to provide a seal and wipe the wall of cylinder 32 as piston 30 reciprocates therein.

Spacer-expander 22 is constructed from a strip of metal into a generally circular radially corrugated form having normally abutting ends 34. Ends 34 separate as spacer-expander 22 is opened for assembly to piston 30, and return to abutting relationship when spacer-expander 22 is in groove 28. Spacer-expander 22 comprises a plurality of inner crowns 36 and outer crowns 38. Outer crowns 38 are spaced radially outwardly of inner crowns 36 and each outer crown 38 is also circumferentially interposed between circumferentially adjacent inner crowns 36. This arrangement provides an alternating progression of outer and inner crowns around spacer-expander 22.

The outer crowns 38 and inner crowns 36 are connected by legs 44. Legs 44 are outwardly inclined and are curved at the ends to blend into crowns 36 and 38. Each inner crown 36 is provided with upper and lower tabs or projections 46. Tabs 46 engage rails 24 and 26 at their inner circumference.

Legs 44 except for the three legs immediately adjacent each end 34, are provided with slots 48 which extend into inner and outer crowns 36, 38. The three legs adjacent each end 34 of the spacer-expander are provided with slots 50 of lesser extent than slots 48. Slots 50 extend from the lower crown 36 but terminate short of the upper crown 38. Slots 48 terminate within the curved ends of legs 44 adjacent crowns 36 and 38 as at 52 and 54 respectively and provide venting for the flow of lubricating oil through the spacer-expander. Slots 50 have one terminus adjacent crowns 36 as at 56 and the other terminus preferably in the middle region of leg 44 as at 57. Thus, although the radially inner portions of slots 48 are circumferentially aligned with slots 50, slots 48 extend radially outwardly so as to be radially larger than slots 50. The spacer-expander as thus far described is essentially the same as that described in the above said U.S. Pat. No. 2,789,872 except for the ensmalled holes 50.

The spacer-expander is provided with a slip latch 58 for the purpose of keeping ends 34 aligned. This slip latch preferably takes the form of a rod passing through openings 50 in the legs adjacent each end 34 and is preferably of a length such that the rod will also extend through a plurality of the long slots 48. As herein shown by way of example, the slip latch 58, when the ends 34 of the spacer-expander are in abutment, extends through six legs 44 (preferably three such legs adjacent each end 34) having short slots 50 and in addition thereto seven legs 44 having the latch slots 48. The length of latch 58 should be sufficient to permit expanding of the spacer-expander and spreading of the ends 34 sufficient to permit the spacer-expander to be slipped over the piston during assembly of the spacer-expander into the ring groove of the piston. A latch of the length above described has proved satisfactory for the length of the latch 58 and the number of legs with large and small slots therein through which it extends can be increased or decreased as long as the latch serves its intended function of guiding and aligning the ends 34 of the spacer expander when the ends are spread apart (FIG. 2) and bringing and maintaining the ends 24 in abutting relation when the gap is closed.

The ends of the latch are upset or enlarged as at 60. Latch 58 can be made from any suitable material such as a plastic or metal wire rod. Preferably latch 58 is formed from a length of cylindrical plastic stock such as nylon set to a radius of curvature less than that of the spacer-expander. Preferably the nylon cylindrical stock or filament is coiled and heat set to a diameter three-quarters of an inch to 1 inch less than the diameter of the piston ring assembly, that is, ¾ of an inch to 1 inch less than the bore diameter of the engine cylinder in which the spacer-expander will operate. Likewise when latch 58 is made from spring wire, the wire is likewise curved and set to a diameter of from three-quarters of an inch to one inch less than the bore diameter of the cylinder of the engine in which the spacer-expander will operate. This means that the nylon or wire latch 58 when threaded into the spacer-expander always hugs the inner crowns 36 of the spacer-expander.

By way of example, one form of nylon filament which has proved satisfactory for latch 58 is known as 6—6 type nylon with a heat stabilizer to give it better properties at high temperature. The nylon filament is heat set by coiling it to the desired diameter and heating it to 425° F. for 30 minutes. This sets the nylon to the curvature of the mandrel on which it is coiled.

The ends of latch 58, when made of nylon, are enlarged under heat and pressure to form enlarged stops 60 which will not pass through slots 50 and thus prevent latch 58 from being pulled through slots 50 as ends 34 are separated. However, stops 60 are small enough to pass through slots 48. With latch 58 installed in spacer-expander 22, stops 60 preferably extend radially outwardly relative thereto. In this way when the ring 22 is expanded (FIG. 2) stops 60 can easily pass through larger slots 48 while latch 58 is guided in smaller slots 50. When latch 58 is made of wire, the ends are upset to form stops 60.

With ends 34 apart as shown in FIG. 2, latch 58 assumes the position shown therein. As ends 34 are closed they are guided into abutting relationship by means of latch 58, and stops 60 pass through slots 48 in adjacent legs 44. Broken lines 62 (FIG. 2) indicate the position of stops 60 when ends 34 abut each other.

Preferably, slots 48 and 50 are located centrally of the width of spacer-expander 22. The dimensions of slots 48 are such as to allow latch 58 and stops 60 to pass therethrough. Latch 58 slides along the outer faces of inner crowns 36 as the spacer-expander opens and closes and thus stops 60 cannot pass through slots 50 and the latch 58 is maintained in operative relation with spacer-expander 22.

In its preferred form, particularly for production line assembly purposes, latch 58 has a stop 60 at each end. However, latch 58 will work successfully with a stop 60 at one end only, particularly when used for replacement purposes in an engine.

The following example illustrates a spacer-expander construction for an engine cylinder having a diameter or bore of 3.875 inches which has been found to perform satisfactorily during the opening and closing thereof for guiding the ends into and out of abutment.

| | | |
|---|---|---|
| Length of metal strip before forming | 15.876 | in. |
| Strip width | .177–.182 | in. |
| Strip thickness | .025 | in. |
| Number of outer crowns | 31 | |
| Number of inner crowns | 32 | |
| Dimensions of large slot (slot 48) before forming | .176 in.×.050 | in. |
| Dimensions of small slot (slot 50) before forming | .091 in.×.050 | in. |
| Inside diameter with ends 34 in abutment | 3.596–3.618 | in. |
| Nylon rod diameter | .040 | in. |
| Latch stop circumferential width | .065 | min. in. |
| Latch stop radial width | .070–.085 | min. in. |
| Latch stop axial width | .010 | min. in. |
| Length of latch | 2.25–2.30 | |

Figure 7:
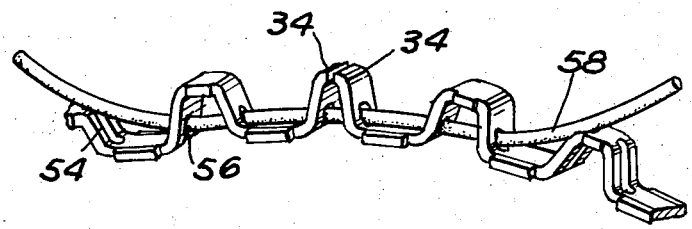
FIG. 7 is a perspective view showing the first step in the method of constructing the improved spacer-expander of the present invention.

The method for constructing the improved spacer-expander and latch is described with reference to FIGS. 6 through 11. FIG. 6 shows a length of nylon rod or wire 58 which has a radius of curvature stated above which is less than the radius of curvature of spacer-expander 22. With the curvature of rod 58 opposite to the curvature of spacer-expander 22, rod 58 is threaded through slots 50 while ends 34 are maintained in or close to abutment (FIG. 7). The radius of curvature of rod 58 lays outside the spacer-expander.

Figure 8:
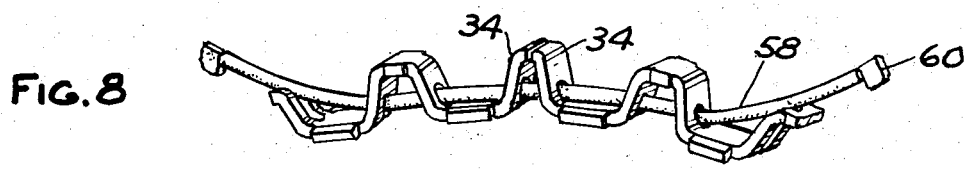
FIG. 8 is a perspective view showing the second step in the method of constructing the improved spacer-expander of the present invention.

With rod 58 now threaded through spacer-expander 22 as shown in FIG. 7, and where latch 58 is made of nylon, heat and pressure are applied to the ends thereof to form stops 60, as shown in FIG. 8. In case the latch 58 is made of wire, the ends are upset in any conventional manner to form stop 60.

Figure 9:
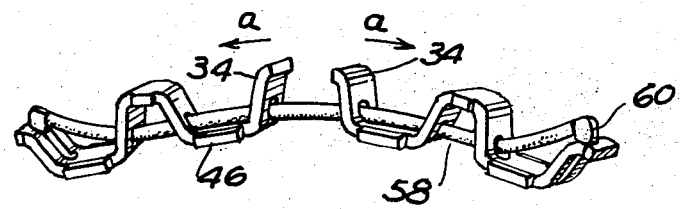
FIG. 9 is a perspective view showing the third step in the method of constructing the improved spacer-expander of the present invention.

Next, ends 34 are separated as indicated by arrows *a* in FIG. 9. The center of curvature of filament 58 is still outside the spacer-expander but in the same plane.

Figure 10:
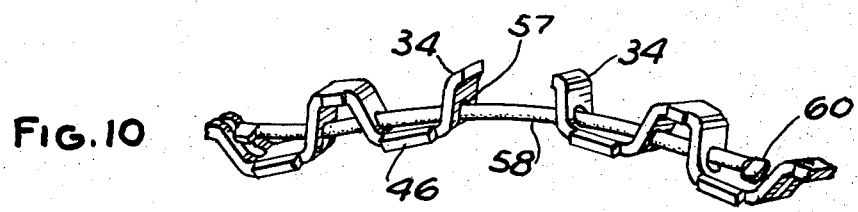
FIG. 10 is a perspective view showing the fourth step in the method of constructing the improved spacer-expander of the present invention.

As ends 34 are separated further, rod 58 tends to rotate within slots 50 so as to align its curvature with that of spacer-expander 22. FIG. 10 shows latch 58 rotated 90° within slots 50. The center of curvature of nylon latch 58 is in a plane at right angles to the plane of spacer-expander 22.

Figure 11:
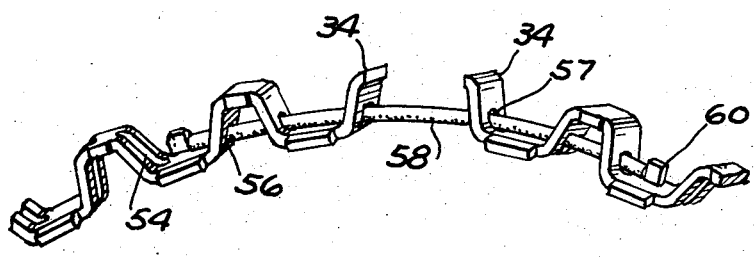
FIG. 11 is a perspective view showing the fifth step in the method of constructing the improved spacer-expander of the present invention.

Opening the gap of the spacer-expander further to a point where the stops 60 are just short of the slots 50 in the third leg from ends 34 to rotate the latch 58 180° where the curvature of rod 58 coincides with curvature of the spacer-expander, the center of curvature is now substantially coincident with the center of spacer-expander 22 (FIG. 11). Ends 34 are now guided by latch 58 into abutting aligned relationship as spacer-expander 22 is closed. Latch 58 serves as a stringer or latch for aligning ends 34 of the spacer-expander.

The above described method is but one method of making and assembling the latch to the spacer-expander or, for that matter, a spacer alone when the spacer and expander are made as separate parts.

Another method for making and assembling the latch to the spacer-expander consists of starting with a coil of nylon rod or filament or a coil of spring wire wherein the coils have a radius of curvature less than the radius of curvature of the spacer-expander as above described. The end of the coiled rod may then be threaded through the spacer-expander as shown in FIG. 11 with the curvature of the coiled rod coinciding with that of the spacer-expander. The end portion of the rod will be severed and the ends upset to form the stops 60. If desired one can also sever from a coil of spring wire or a coil of nylon rod, a length of rod, such as shown in FIG. 6, and then thread the curved rod 58 through the slots 48 and 50, as shown in FIG. 11, and then upset the ends of the rod to form a stop 60.

The above described methods are merely examples of methods by which the spacer-expander and slip latch can be made.

Figure 12:
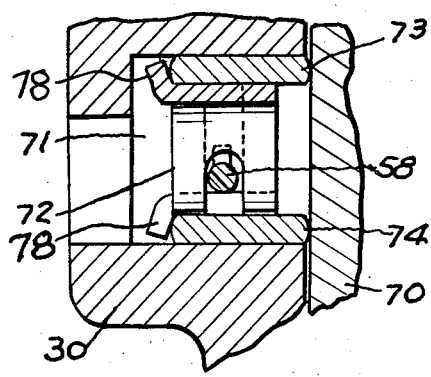
FIG. 12 is a sectional view of a piston ring consisting of an axially corrugated spacer-expander and two rails installed in an engine.

Referring to FIG. 12 there is shown a portion of an engine cylinder 70 provided with a ring groove 71 in which is mounted an axially corrugated spacer-expander 72 provided with upper and lower rails 73 and 74.

Figure 13:
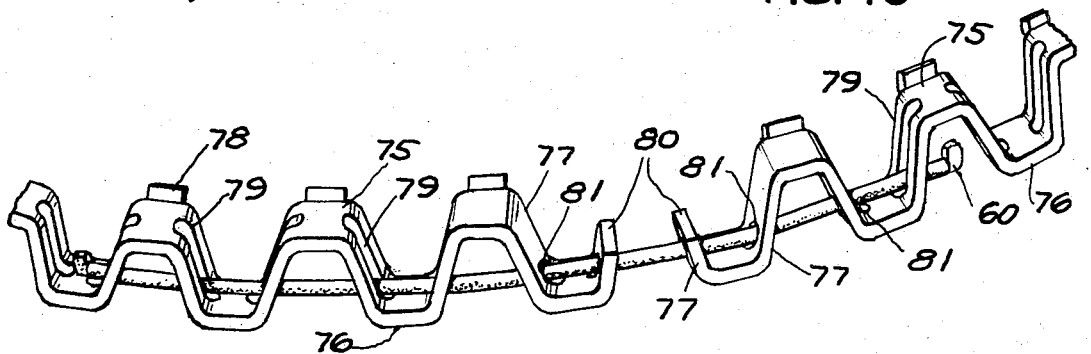
FIG. 13 is a fragmentary perspective view showing an axially corrugated spacer-expander provided with a slip latch.
Figure 14:
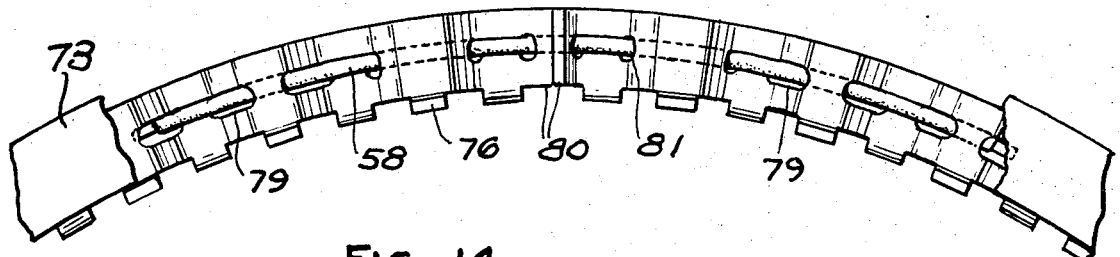
FIG. 14 is a fragmentary top plan view of the piston ring assembly having a portion of the top rail broken away to expose the axially corrugated spacer-expander and slip latch.
Figure 15:
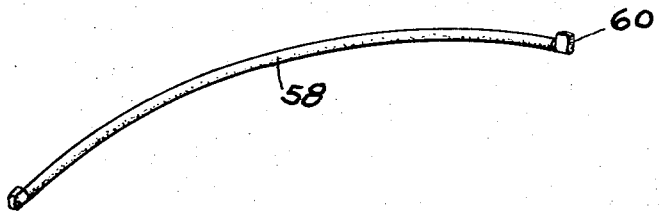
FIG. 15 is a perspective view showing the slip latch having a radius of curvature as described below.

Referring to FIGS. 13 and 14, it will be seen that the spacer-expander is made from a strip steel stock which is axially corrugated to provide upper crowns 75 and lower crowns 76 connected by upwardly and outwardly inclined legs 77. The spacer-expander 72 is provided with tabs 78 against which rails 73 and 74 abut at their inner circumference. Legs 77 (excepting the three legs adjacent the ends 80) are provided with conventional oil venting slots 79 which extend between upper crown 75 and lower crown 76. Slots 79 may conventionally be dimensioned the same as long slots 48 described above. The three legs 77 adjacent each of the ends 80 are provided with smaller slots 81 preferably of the same magnitude as slots 50 described above. The end abutments 80 likewise are provided with slots 81. The axially corrugated spacer-expander latch is identical to latch 58 described above. In this form of spacer-expander, latch 58 is assembled therein in the same manner described above with respect to the radially corrugated spacer-expander and functions in the same manner to keep ends 80 in alignment and in abutting relation during the assembly of the spacer-expander into the piston ring groove 71 and into the bore of the engine cylinder 70.

Although the latch 58 is shown applied to a spacer-expander, it is understood that it can be similarly applied or assembled to a conventional radially or axially corrugated expander wherein the spacer and the expander of the piston ring are separate items.

The slip latch 58 acts through short or small slots 50 to align and guide ends 34 as the spacer-expander is opened and closed. Preferably there are small openings 50 in each of the three legs 44 adjacent the ends 34 of the spacer-expander to properly guide the spacer-expander on the latch rod. However, if desired but not preferred, only one or two of said legs adjacent each of the ends 34 may be provided with a small opening or openings 50 and the remaining legs provided with the conventional larger slots 48. In such latter case the small openings 50 will prevent the latch from pulling out of the spacer-expander when expanded, but the latch may not serve as well to guide and align the ends 34 of the spacer-expander during the opening and closing thereof as in the preferred form.

We claim:

1. In a parted piston ring adapted for use in a cylinder bore of an internal combustion engine the combination of a generally circular corrugated strip of metal having ends adapted to abut each other, a plurality of the legs of said corrugations adjacent each of the abutting ends having openings therein of one size and a second plurality of legs adjacent the first plurality of legs having openings therein of a larger size, a slip latch in the form of a curved rod having a curvature generally coinciding with that of the generally circular corrugated strip and when said ends are in abutted relation extending through the openings of said one size in the first plurality of legs of the corrugated strip and through one or more of the larger openings in the second plurality of legs adjacent thereto, a stop at each end of the rod, each stop being dimensioned so that it will pass through the larger openings and will abut the leg around the opening of the smaller size whereby the rod serves as a slip latch for latching the ends of the corrugated strip in aligned relation when the strip is parted and the rod cooperates with said openings of smaller size to guide the said ends into abutting relation when the circular strip is closed.

2. The combination set forth in claim 1 wherein the said curved rod in its unstressed condition has a radius of curvature less than the radius of the generally circular corrugated strip.

3. The combination set forth in claim 2 wherein the curved rod in its unstressed condition has a diameter ranging from three quarters of an inch to an inch less than the diameter of the generally circular corrugated strip when the corrugated strip is installed in the cylinder bore.

4. The combination set forth in claim 1 wherein the said strip is radially corrugated.

5. The combination set forth in claim 1 wherein the strip is axially corrugated.

6. The combination set forth in claim 1 wherein the corrugations provide inner and outer crowns connected by radially outwardly diverging legs, the said latch riding on the radially outer faces of the inner crowns during the opening and closing of the corrugated strip.

7. The combination set forth in claim 3 wherein the corrugations provide upper and lower crowns connected by axially outwardly diverging legs, the said latch riding on the upper faces of the lower crowns during opening and closing of the corrugated strip.

8. The combination set forth in claim 4 wherein the rod consists of nylon.

9. The combination set forth in claim 5 wherein the rod consists of nylon.

10. The combination set forth in claim 6 wherein the slip latch consists of spring wire.

11. The combination set forth in claim 7 wherein the slip latch consists of spring wire.

12. The combination set forth in claim 2 wherein the said strip is radially corrugated.

13. The combination set forth in claim 2 wherein the strip is axially corrugated.

14. A spacer and expander for supporting, spacing and outwardly pressing generally flat parted thin rails in a piston ring comprising a generally circular, radially, corrugated length of flat metal ribbon stock having ends movable into and out of abutting relationship, the corrugations comprising a plurality of circumferentially spaced outer crowns and a plurality of circumferentially spaced inner crowns, the outer crowns alternating with respect to the inner crowns to thereby form an alternating progression of outer and inner crowns around said spacer expander, said alternate inner and outer crowns having integrally generally outwardly diverging connecting legs extending from the inner crowns to the outer crowns, a plurality of legs adjacent each of the ends of the spacer expander having openings therein of one size and a second plurality of legs adjacent the first plurality of legs having openings therein of a larger size, a slip latch in the form of a curved rod having a curvature generally coinciding with that of the spacer-expander and when said ends are in abutting relation extending through the openings of said one size in the first plurality of legs of the spacer-expander and through one or more of the larger openings in the second plurality of legs adjacent thereto, a stop at each end of the rod, each stop being dimensioned so that it will pass through the larger openings and will abut the leg around the opening of the smaller size whereby the rod serves as a slip latch for latching the ends of the spacer-expander in aligned relation when the spacer-expander is parted and the rod cooperates with said openings of smaller size to guide the said ends into abutting relation when the spacer-expander is closed.

15. The combination set forth in claim 14 wherein the said curved rod in its unstressed condition has a radius of curvature less than that of the spacer-expander.

16. The combination set forth in claim 15 wherein the curved rod in unstressed condition has a diameter ranging from three-quarters of an inch to an inch less than the diameter of the spacer-expander when installed in the cylinder bore.

17. A spacer and expander for supporting, spacing and outwardly pressing generally flat parted thin rails in a piston ring comprising a generally circular, axially, corrugated length of flat metal ribbon stock having ends movable into and out of abutting relationship, the corrugations comprising a plurality of circumferentially spaced upper crowns and a plurality of circumferentially spaced lower crowns, the upper crowns alternating with respect to the lower crowns to thereby form an alternating progression of upper and lower crowns around said spacer-expander, said alternate upper and lower crowns having integrally generally upwardly diverging connecting legs extending from the lower crowns to the upper crowns, a plurality of legs adjacent each of the ends of the spacer-expander having openings therein of one size and a second plurality of legs adjacent the first plurality of legs having openings therein of a larger size, a slip latch in the form of a curved rod having a curvature generally coinciding with that of the spacer-expander and when said ends are in abutted relation extending through the openings of said one size in the first plurality of legs of the spacer-expander and through one or more of the larger openings in the second plurality of legs adjacent thereto, a stop at each end of the rod, each stop being dimensioned so that it will pass through the larger openings and will abut the leg around the opening of the smaller size whereby the rod serves as a slip latch for latching the ends of the spacer-expander in aligned relation when the spacer-expander is parted and the rod cooperates with said openings of smaller size to guide the said ends into abutting relation when the spacer-expander is closed.

18. The combination as set forth in claim 17 wherein the curved rod in its unstressed condition has a diameter ranging from three-quarters of an inch to an inch less than the diameter of the spacer-expander when the spacer-expander is installed in the cylinder bore.

19. The combination set forth in claim 14 wherein the curved rod has its center of curvature within the spacer-expander.

20. The combination set forth in claim 17 wherein the curved rod has its center of curvature within the spacer-expander.

21. In a parted piston ring adapted for use in a cylinder bore of an internal combustion engine the combination of a generally circular corrugated strip of metal having ends adapted to abut each other, a plurality of the legs of said corrugations adjacent each of the abutting ends having openings therein of one size and a second plurality of legs adjacent the first plurality of legs having openings therein of a larger size, a slip latch in the form of a curved rod having a curvature generally coinciding with that of the generally circular corrugated strip and when said ends are in abutted relation extending through the openings of said one size in the first plurality of legs of the corrugated strip and through one or more of the larger openings in the second plurality of legs adjacent thereto, a stop at at least one end of the rod, said stop being dimensioned so that it will pass through the larger openings and will abut the leg around the opening of the smaller size whereby the rod serves as a slip latch for latching the ends of the corrugated strip in aligned relation when the strip is parted and the rod cooperates with said openings of smaller size to guide the said ends into abutting relation when the circular strip is closed.

22. The combination set forth in claim 21 wherein the curved rod in its unstressed condition has a diameter ranging from three quarters of an inch to an inch less than the diameter of the generally circular corrugated strip when the corrugated strip is installed in the cylinder bore.

23. The combination set forth in claim 21 wherein the said strip is radially corrugated.

24. A spacer and expander for supporting, spacing and outwardly pressing generally flat parted thin rails in a piston ring comprising a generally circular, radially, corrugated length of flat metal ribbon stock having ends movable into and out of abutting relationship, the corrugations comprising a plurality of circumferentially spaced outer crowns and a plurality of circumferentially spaced inner crowns, the outer crowns alternating with respect to the inner crowns to thereby form an alternating progression of outer and inner crowns around said spacer expander, said alternate inner and outer crowns having integrally generally outwardly diverging connecting legs extending from the inner crowns to the outer crowns, a plurality of legs adjacent each of the ends of the spacer expander having openings therein of one size and a second plurality of legs adjacent the first plurality of legs having openings therein of a larger size, a slip latch in the form of a curved rod having a curvature coinciding with that of the spacer-expander and when said ends are in abutting relation extending through the openings of said one size in the first plurality of legs of the spacer-expander and through one or more of the larger openings in the second plurality of legs adjacent thereto, a stop at at least one end of the rod, said stop being dimensioned so that it will pass through the larger openings and will abut the leg around the opening of the smaller size whereby the rod serves as a slip latch for latching the ends of the spacer-expander in aligned relation when the spacer-expander is parted and will guide the said ends into abutting relation when the spacer-expander is closed.

25. A spacer and expander for supporting, spacing and outwardly pressing generally flat parted thin rails in a piston ring comprising a generally circular, axially, corrugated length of flat metal ribbon stock having ends movable into and out of abutting relationship, the corrugations comprising a plurality of circumferentially spaced upper crowns and a plurality of circumferentially spaced lower crowns, the upper crowns alternating with respect to the lower crowns to thereby form an alternating progression of upper and lower crowns around said spacer-expander, said alternate upper and lower crowns having integrally generally upwardly diverging connecting legs extending from the lower crowns to the upper crowns, a plurality of legs adjacent each of the ends of the spacer-expander having openings therein of one size and a second plurality of legs adjacent the first plurality of legs having openings therein of a larger size, a slip latch in the form of a curved rod having a curvature coinciding with that of the spacer-expander and when said ends are in abutted relation extending through the openings of said one size in the first plurality of legs of the spacer-expander and through one or more of the larger openings in the second plurality of legs adjacent thereto, a stop at at least one end of the rod, said stop being dimensioned so that it will pass through the larger openings and will abut the leg around the opening of the smaller size whereby the rod serves as a slip latch for latching the ends of the spacer-expander in aligned relation when the spacer-expander is parted and will guide the said ends into abutting relation when the spacer-expander is closed.

* * * * *